Patented May 23, 1933

1,910,564

UNITED STATES PATENT OFFICE

LANNING PARKE RANKIN, OF DOVER, NEW JERSEY, ASSIGNOR TO HERCULES POWDER COMPANY, OF WILMINGTON, DELAWARE, A CORPORATION OF DELAWARE

DRYING OIL AND METHOD OF PRODUCING THE SAME

No Drawing.      Application filed February 15, 1928.   Serial No. 254,599.

My invention relates to an improvement in drying oils and method of producing the same. More particularly, my invention relates to the production of a drying oil, of a character such that it may be used as a substitute for linseed oil, by the treatment of limonene, or equivalently by the treatment of dipentene, the optically inactive isomer of limonene.

In accordance with my invention I subject limonene, or its optically inactive isomer dipentene to ozonization, for example, by passing through its oxygen containing ozone.

The limonene or dipentene will completely absorb ozone and will become more and more viscous as ozonization continues. The viscosity of the product may be somewhat varied by control of the temperature of ozonization. The ozonization product or drying oil in accordance with my invention will be found to dry rapidly and to produce a dried film of high gloss and flexibility.

In accordance with my invention when dipentene is used such may be substantially pure (B. P. 172° C.–178° C.) or a terpene cut boiling within about the range 165° C.–180° C. may be used in place of pure dipentene. Dipentene may be obtained by fractionation of terpenes or by dehydration of the tertiary alcohols in pine oil, which will yield a product consisting largely of dipentene, or from which substantially pure dipentene may be readily separated.

The product in accordance with my invention will be found to have a slight solvent action upon nitrocotton. However, if the product be heated, for example, if ozonized dipentene be heated to about 120° C., its solvency for nitrocotton will be substantially increased with, however, a substantial decrease in drying rate. The solvent action of the product on nitrocotton may be improved by boiling in water, but the boiling treatment will also very substantially decrease the drying rate.

The ozonization of the limonene or dipentene is preferably effected by bubbling through the limonene or dipentene oxygen containing ozone, though it will be understood that air or the like may be substituted for oxygen. The ozonization may be effected in the vapor phase, the vapors of limonene or dipentene being passed through oxygen or air containing ozone and the limonene or dipentene may be first applied to a surface as a film and then ozonized with oxygen or air containing ozone. Since, as has been indicated, during ozonization the limonene or dipentene becomes more viscous, and since the viscosity of the final product may be controlled through control of the temperature during ozonization, it is preferable that ozonization be carried out within a temperature range of about 0° C.–70° C. However, it will be understood that ozonization may be carried out within a temperature range of −40° C.–+110° C.

As a specific example of the carrying out of the method in accordance with my invention, about 100 g. of dipentene may be ozonized by bubbling through it about 100 litres of oxygen containing about 3 g. of ozone, for a period of about four hours. During the ozonization the temperature may be desirably maintained at about 35° C. The product will be found to dry in about one-half hour after spreading and to produce a film of desirable gloss and hardness.

As an example of the preparation of ozonized limonene, say twenty-five grams of limonene may be ozonized by passing one liter per minute of ozonized oxygen, containing twenty milligrams of ozone per litre, through it for two hours at a temperature of 25° C. A film formed by the ozonized product will dry in about one hour.

The drying rate of the ozonized product may be varied by variation in the treatment and, for example, products drying in from one-quarter hour to three hours may be obtained; and the drying rate of the heat-treated product may be increased by the addition of a small amount of drier.

If it be desired to increase the solvent action of the ozonized limonene or dipentene on, for example, nitrocotton, such may be accomplished, for example, by heating the product to a temperature of about 120° C., thus causing partial decomposition and rearrangement to more stable compounds which are better solvents for nitrocotton but which, however, dry at a substantially slower rate, hence the increased solvency of the product for the nitrocotton is obtained at a sacrifice of drying speed.

The decomposition of the ozonized product on heating also causes it to lose about 80% or more of its iodine liberating power and its acid number and saponification number are increased.

Alternately the solvent action of the ozonized product on carbohydrates, as, for example nitrocotton, may be increased by boiling the product in water, such treatment, however, will also result in substantially decreasing the drying rate of the product. When the ozonized product is treated by heating with water various temperatures may be employed or steam passed into the ozonized product. When the water with which the ozonized product is treated contains an alkali, acid and phenolic compounds are separated.

The ozonized product accordingly to my invention is miscible either with linseed oil or china-wood oil, provided the ozonization is not carried too far, and it will be found advantageous under certain circumstances to use the ozonized product in conjunction with either of the foregoing oils. As a further example of the use to which the product may be put, for example, varnish may be made by diluting 50 parts of the ozonized product with a solvent, as for example 50 parts of benzene, or the like, and, if desired, various gums may be added.

As has been indicated, the ozonized product in accordance with my invention, may be produced by the treatment of either limonene, or of its optically inactive isomer dipentene, or in place of pure dipentene, of dehydrated pine oil, or a terpene fraction boiling within about the range 165° C.–180° C., and it will be understood that in connection with my invention I intend that limonene, dipentene, dehydrated pine oil and a terpene cut boiling within about the range 165° C.–180° C. shall be equivalents one for the other and where in the claims appended hereto reference is made to dipentene, I intend to include dehydrated pine oil, the terpene cut indicated and limonene as equivalents for dipentene.

Having now fully described my invention, what I claim and desire to protect by Letters Patent is:

1. The method of producing a drying oil which includes chemically combining ozone and dipentene in liquid phase in the presence of heat at a temperature below 110° C.

2. The method of producing a drying oil which includes chemically combining ozone and dipentene in liquid phase and in the absence of a non-terpene solvent.

3. The method of producing a drying oil which includes subjecting dipentene in liquid phase to ozonization at a temperature within about the range 0° C.–70° C. and in the absence of a non-terpene solvent.

4. The method of producing a drying oil which includes subjecting dipentene to ozonization at a temperature within about the range −40° C.–+110° C. in the absence of a non-terpene solvent.

In testimony of which invention, I have hereunto set my hand, at Kenvil, N. J., on this 10th day of February, 1928.

LANNING PARKE RANKIN.